US 8,457,203 B2

(12) United States Patent
Bossen et al.

(10) Patent No.: US 8,457,203 B2
(45) Date of Patent: Jun. 4, 2013

(54) METHOD AND APPARATUS FOR CODING MOTION AND PREDICTION WEIGHTING PARAMETERS

(75) Inventors: Frank Bossen, Plan-les Outes (CH); Alexandros Tourapis, Burbank, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1896 days.

(21) Appl. No.: 11/440,604

(22) Filed: May 24, 2006

(65) Prior Publication Data

US 2006/0268166 A1    Nov. 30, 2006

Related U.S. Application Data

(60) Provisional application No. 60/685,261, filed on May 26, 2005.

(51) Int. Cl.
*H04B 1/66* (2006.01)
*H04N 7/12* (2006.01)

(52) U.S. Cl.
USPC ................................. 375/240.15; 375/240.01

(58) Field of Classification Search
USPC ............... 348/10, 12, 13, 455, 445, 446, 448, 348/451, 452, 458, 459, 699, 443, 700, 390.1; 382/240; 375/240.16, 240.11, 240.01, 240.08, 375/240.1, 240.23
See application file for complete search history.

(56) References Cited

U.S. PATENT DOCUMENTS

| | | | | |
|---|---|---|---|---|
| 5,835,087 A | * | 11/1998 | Herz et al. ..................... | 715/810 |
| 7,003,035 B2 | * | 2/2006 | Tourapis et al. .......... | 375/240.12 |
| 7,466,774 B2 | * | 12/2008 | Boyce ........................... | 375/342 |
| 2003/0123742 A1 | * | 7/2003 | Zhao et al. .................... | 382/240 |
| 2004/0057523 A1 | * | 3/2004 | Koto et al. ............... | 375/240.26 |
| 2005/0281334 A1 | * | 12/2005 | Walker et al. ............ | 375/240.16 |
| 2006/0008006 A1 | * | 1/2006 | Cha et al. ................ | 375/240.16 |
| 2006/0072662 A1 | * | 4/2006 | Tourapis et al. .......... | 375/240.12 |
| 2006/0153297 A1 | * | 7/2006 | Boyce ....................... | 375/240.16 |
| 2006/0198440 A1 | * | 9/2006 | Yin et al. ................. | 375/240.12 |
| 2006/0262856 A1 | * | 11/2006 | Wu et al. .................. | 375/240.19 |
| 2008/0253456 A1 | * | 10/2008 | Yin et al. ................. | 375/240.16 |

FOREIGN PATENT DOCUMENTS

| | | |
|---|---|---|
| CN | 1507751 A | 6/2004 |
| CN | 1579098 A | 2/2005 |
| JP | 2004007379 | 1/2004 |
| WO | WO 2005/004492 A2 | 1/2005 |
| WO | WO 2005/109898 A | 11/2005 |

OTHER PUBLICATIONS

"Advanced Video Coding for Generic Audiovisual Services." Series H: Audiovisual and Multimedia Sytems. ITU-T Telecommunication Standardization Section of ITU H. 264.
Boyce, J.: "Weighted Prediction in the H.264/MPEG AVC Video Coding Standard." ISCAS May 2004, pp. 789-792.

(Continued)

*Primary Examiner* — Behrooz Senfi
(74) *Attorney, Agent, or Firm* — Blakely, Sokoloff, Taylor & Zafman LLP

(57) ABSTRACT

A method and apparatus is disclosed herein for encoding and/or decoding are described. In one embodiment, the encoding method comprises generating weighting parameters for multi-hypothesis partitions, transforming the weighting parameters and coding transformed weighting parameters.

44 Claims, 10 Drawing Sheets

OTHER PUBLICATIONS

Rodrigues, N., et al.; "Hierarchical Motion Compensation with Spatial and Luminance Transformations." IEEE Oct. 2001, pp. 518-521.
Kamikura, K., et al.; "Global Brightness-Variation Compensation for Video Coding." IEEE Transactions on Circuits and Systems for Video Technology, vol. 8, No. 8, Dec. 1998, pp. 958-1000.
Rodrigues, N., et al.; "Low Bit Rate Video Coding with Spatial and Luminance Transformations," ConfTele 2001, Figueira da Foz, Apr. 22-24, 2001.
T. Wiegand et. al., "Draft Errata List with Revision-Marked Corrections for H.264/AVC", California, Sep. 2003, ftp://ftp.imtc.org/jvt-experts/2003_09_SanDiego/JVT-1050.zip.
Chinese Office Action for Chinese Patent Application No. 200680016666.X, dated Oct. 9, 2009, 3 pages *English Translation*.
PCT International Search Report for PCT Appln No. US 2006/020633, mailed Nov. 7, 2006 (4 pages).
PCT Written Opinion for PCT Appln No. US 2006/020633, mailed Nov. 7, 2006 (6 pages).
PCT International Preliminary Report on Patentability, PCT US 2006/020633, mailed Dec. 13, 2007 (1 page).
PCT Written Opinion of the International Searching Authority, PCT US 2006/020633, mailed Dec. 13, 2007 (6 pages).
Boyce J.M., "Weighted prediction in the H.264/MPEG AVC video coding standard," Circuits and Systems, 2004. ISCAS '04. Proceedings of the 2004 International Symposium on Vancouver, BC, Canada May 23-26, 2004, Piscataway, NJ, USA; IEEE, US, May 23, 2004, pp. III-789 XP010719383 ISBN: 0-7803-8251-X.
Japanese Office Action for corresponding Japanese Patent Application No. 2008-508011, Oct. 5, 2010, 4 pgs. *English Translation*.
European Office Action for corresponding European Patent Application No. 06771414.7, Feb. 1, 2010, 4 pgs.
Japanese Office Action for related Japanese Patent Application No. 2010-271444, Jun. 26, 2012, 3 pgs.
Okubo, "H.264/AVC Textbook, Impress Standard Textbook Series", Aug. 11, 2004, pp. 119-131, Impress Japan Corporation, Net Business Company *English Translation Provided*.
Nanda, "Effect of Quantization on Video Compression", IEEE International Conference on Industrial Technology, 2002, pp. 764-768, vol. 2.

* cited by examiner

MVD = displacement difference

METHOD AND APPARATUS FOR CODING MOTION AND PREDICTION WEIGHTING PARAMETERS

PRIORITY

The present patent application claims priority to and incorporates by reference the corresponding provisional patent application Ser. No. 60/685,261, titled, "Method And Apparatus For Coding Motion and Prediction Weighting Parameters" filed on May 26, 2005.

FIELD OF THE INVENTION

The present invention relates to the field of video coding and decoding; more particularly, the present invention relates to coding motion and prediction weighting parameters.

BACKGROUND OF THE INVENTION

Motion Compensated (Inter-frame) prediction is a vital component of video coding schemes and standards such as MPEG-1/2, and H.264 (or JVT or MPEG AVC) due to the considerable benefit it could provide in terms of coding efficiency. However, until recently, in most of these standards, motion compensation was performed by primarily, if not only, considering temporal displacement. More specifically, standards such as MPEG-1, 2, and MPEG-4 consider two different picture types for inter-frame prediction, predictive (P) and bi-directionally predicted (B) pictures. Such pictures are partitioned into a set of non-overlapping blocks, each one associated with a set of motion parameters. For P pictures, motion parameters were limited to a horizontal and a vertical displacement of the current block I(x,y) versus a references, which indicated the position of a second block I(x',y') which would be used for predicting I(x,y). FIG. 1A illustrates an example of motion compensation in P pictures. For B pictures, however, this could alternatively or additionally involve the consideration of a horizontal and vertical displacement from a second reference. FIG. 1B illustrates an example of motion compensation in B pictures. In the later case, essentially prediction is formed by averaging both predictions from these two references, using equal weighting factors of (½, ½).

Unfortunately, the above model was not sufficient for video scenes containing temporal brightness variations, such as fades, crossfades, flashes, camera-iris adjustments etc. Thus, the simple translational only inter-frame technique cannot sufficiently improve coding efficiency when temporal brightness variation is involved. For this purpose, several methods were previously proposed that also consider luminance variations during motion compensation. See Kamikura, et al., "Global Brightness-Variation Compensation for Video Coding," IEEE Trans on CSVT, vol. 8, pp. 988-1000, December 1998; Rodrigues, et al., "Hierarchical Motion Compensation with Spatial and Luminance Transformations", ICIP, pp. 518-521, October 2001; Rodrigues, et al., "Low-Bit Rate Video Coding with Spatial and Luminance Transformations", ConfTele2001, Figueira da Foz, 22-24 Apr., 2001; and J. Boyce, "Weighted Prediction in the H.264/MPEG4 AVC Video Coding Standard", ISCAS, pp. 789-792, May 2004.

More specifically, instead of considering only geometric transformations during motion compensation, the predicted signal is also scaled and/or adjusted using two new parameters w and o. The sample with brightness value I(x,y,t) at position (x,y) at time t, is essentially constructed as w*I(x+dx, y+dy, t')+o, where dx and dy are the spatial displacement parameters (motion vectors). However, these new weighting parameters could also considerably increase the overhead bits required for representing motion information, therefore potentially reducing the benefit of such strategies. For this purpose, and by making the assumption that most luminance transformations happen globally, Kamikura, et al., in "Global Brightness-Variation Compensation for Video Coding," IEEE Trans on CSVT, vol. 8, pp. 988-1000, December 1998, suggests the usage of only a single set of global parameters (w, o) for every frame. The use or not of these parameters is also signaled at the block level, thereby providing some additional benefit in the presence of local brightness variations.

A somewhat similar strategy is also employed in H.264. This standard, however, also supports several other features that could exploit brightness variations even further. In particular, the codec allows for the consideration of multiple references but also reordering, which enabled multiple weights to be associated with each reference, to better handle local brightness variations. Weights for bi-predicted partitions could also optionally be implicitly derived through the consideration of a temporal, or more precisely a picture order count distance associated with each picture. On the other hand, in Rodrigues, et al., "Hierarchical Motion Compensation with Spatial and Luminance Transformations", ICIP, pp. 518-521, October 2001 and Rodrigues, et al., "Low-Bit Rate Video Coding with Spatial and Luminance Transformations", ConfTele2001, Figueira da Foz, 22-24 Apr., 2001, weights are optionally transmitted, after quantization, using a hierarchical structure to somewhat constrain the bit overhead. However, this method appears to only consider weighted prediction within P frames, and no consideration of Bi-prediction is discussed.

With respect to these techniques, although weighting parameters are considered at the block level, which better handles local brightness variations, the method makes no special consideration of bi-predictive motion compensation, and on how these parameters should be efficiently coded. The focus of these papers is mainly on the potential benefits in terms of improved Mean Square Error of the prediction if luminance transformations are additionally used versus translational only prediction, and less on the coding of the parameters.

The ITU-H.264 (or JVT or ISO MPEG4 AVC) video compression standard has adopted certain weighted prediction tools that could take advantage of temporal brightness variations and could improve performance. The H.264 video coding standard is the first video compression standard to adopt weighted prediction (WP) for motion compensated prediction.

Motion compensated prediction may consider multiple reference pictures, with a reference picture index coded to indicate which of the multiple reference pictures is used. In P pictures (or P slices), only uni-prediction is used, and the allowable reference pictures are managed in list 0. In B pictures (or B slices), two separate reference picture lists are managed, list 0 and list 1. In B pictures (or B slices), uni-prediction using either list 0 or list 1, or bi-prediction using both list 0 and list 1 is allowed. When bi-prediction is used, the list 0 and the list 1 predictors are averaged together to form a final predictor. The H.264 weighted prediction tool allows arbitrary multiplicative weighting factors and additive offsets to be applied to reference picture predictions in both P and B pictures. Use of weighted prediction is indicated in the sequence parameter set for P and SP slices. There are two weighted prediction modes; explicit mode, which is supported in P, SP, and B slices, and implicit mode, which is supported in B slices only.

In the explicit mode, weighted prediction parameters are coded in the slice header. A multiplicative weighting factor and an additive offset for each color component may be coded for each of the allowable reference pictures in list 0 for P slices and list 0 and list 1 for B slices. The syntax, however, also allows different blocks in the same picture to make use of different weighting factors even when predicted from the same reference picture store. This can be made possible by using reordering commands to associate more than one reference picture index with a particular reference picture store.

The same weighting parameters that are used for single prediction are used in combination for bi-prediction. The final inter prediction is formed for the samples of each macroblock or macroblock partition, based on the prediction type used. For a single directional prediction from list 0, $$SampleP=Clip1(((SampleP_0 \cdot W_0+2^{LWD-1})>>LWD)+O_0) \quad (1)$$

and for a single directional prediction from list 1, $$SampleP=Clip1(((SampleP_1 \cdot W_1+2^{LWD-1})>>LWD)+O_1) \quad (2)$$

and for bi-prediction, $$SampleP = Clip1 \\ (((SampleP_0 \cdot W_0 + SampleP_1 \cdot W_1 + 2^{LWD}) >> (LWD + 1)) + \\ (O_0 + O_1 + 1) >> 1) \quad (3)$$

where Clip1( ) is an operator that clips the sample value within the range [0, 1<<SampleBitDepth−1], with SampleBitDepth being the number of bits associated with the current sample, $W_0$ and $O_0$ are the weighting factor and offset associated with the current reference in list 0, $W_1$ and $O_1$ are the weighting factor and offset associated with the current reference in list 1, and LWD is the log weight denominator rounding factor, which essentially plays the role of a weighting factor quantizer. $SampleP_0$ and $SampleP_1$ are the list 0 and list 1 initial predictor samples, while SampleP is the final weight predicted sample.

In the implicit weighted prediction mode, weighting factors are not explicitly transmitted in the slice header, but instead are derived based on relative distances between the current picture and its reference pictures. This mode is used only for bi-predictively coded macroblocks and macroblock partitions in B slices, including those using direct mode. The same formula for bi-prediction as given in the preceding explicit mode section is used, except that the offset values $O_0$ and $O_1$ are equal to zero, and the weighting factors $W_0$ and $W_1$ are derived using the formulas:

$$X=(16384+(TD_D>>1))/TD_D$$

$$Z=clip3(-1024, 1023,(TD_B \cdot X+32)>>6)$$

$$W_1=Z>>2, W_0=64-W_1 \quad (4)$$

This is a division-free, 16-bit safe operation implementation of $$W_1=(64*TD_D)/TD_B$$

where $TD_D$ and $TD_B$ are the clipped within the range [−128, 127] temporal distances between the list 1 reference and the current picture versus the list 0 reference picture respectively.

Although the H.264 video coding standard enables the use of multiple weights for motion compensation, such use is considerably limited by the fact that the standard only allows signaling of up to 16 possible references for each list at the slice level. This implies that only a limited number of weighting factors could be considered. Even if this restriction did not apply, it could be potentially inefficient if not difficult to signal all possible weighting parameters that may be necessary for encoding a picture. Note that in H.264, weighting parameters for each reference are independently coded without the consideration of a prediction mechanism, while the additional overhead for signaling the reference indices may also be significant. Therefore H.264 and the method disclosed in Kamikura, et al., "Global Brightness-Variation Compensation for Video Coding," IEEE Trans on CSVT, vol. 8, pp. 988-1000, December 1998 are more appropriate for global than local brightness variations. In other words, these tools tend to work well for global brightness variations, but due to certain limitations little gain can be achieved in the presence of significant local brightness variation.

SUMMARY OF THE INVENTION

A method and apparatus for encoding and/or decoding are described. In one embodiment, the encoding method comprises generating weighting parameters for multi-hypothesis partitions, transforming the weighting parameters and coding transformed weighting parameters.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1B:
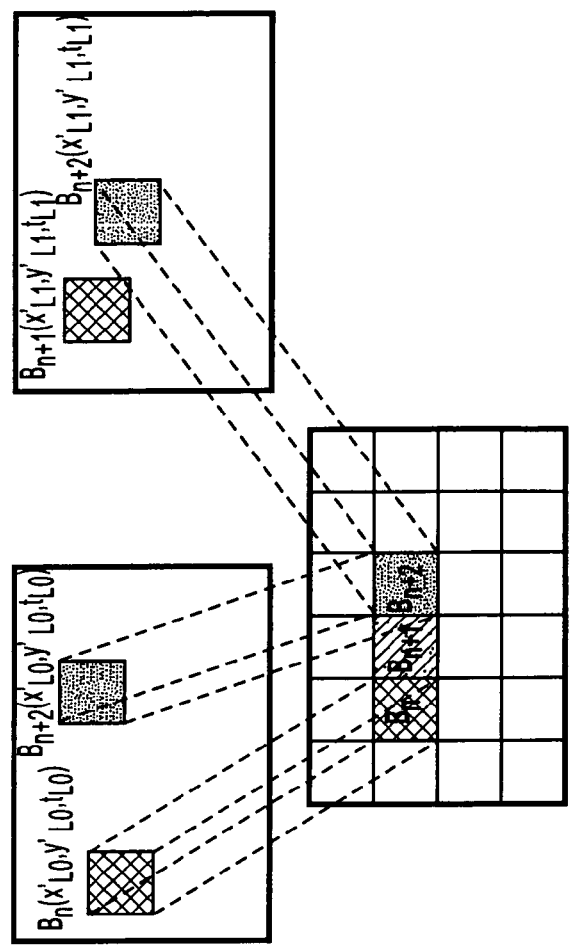
FIG. 1B illustrates an example of motion compensation in B pictures.
Figure 1A:
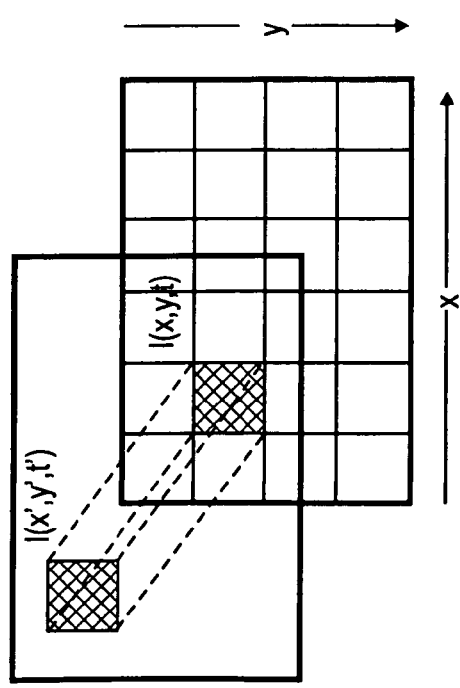
FIG. 1A illustrates an example of motion compensation in P pictures.

An efficient coding scheme for coding weighting parameters within bi-predicted (or multi-predicted) partitions of a video coding architecture is disclosed. This scheme improves performance of the video coding system and can be used to handle local brightness variations. The coding scheme includes a transform process between pairs of weighting parameters associated with each reference for each block that is being subjected to motion compensated prediction. The transform process causes a transform to be applied to the weighting parameters. In one embodiment, the transformed weighting parameters are signaled for every block using a prediction method and are coded using a zero tree coding structure. This reduces the overhead required for coding these parameters. While the methods described herein are primarily aimed at bi-predictive partitions. Some of the concepts could also apply to uni-predicted partitions.

In one embodiment, the interactions between uni-predicted and bi-predicted partitions are used to further improve efficiency. Special consideration is also made for bi-predictive pictures or slices, where a block may be predicted from a different list or both lists.

In one embodiment, the coding scheme is further extended by combining and considering both global and local weighting parameters. Additional weighting parameters transmitted at the sequence, picture, or slice level are also optionally considered.

In another embodiment, the variable granularity dynamic range of such parameters is also taken into account. These weighting parameters are finely adjustable, which provides additional benefits in terms of coding efficiency.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Embodiments of the present invention include a coding scheme that uses motion compensation that includes weighted prediction. The weighting parameters associated with a prediction are transformed and then coded with the offset associated with the prediction. The decoding process is a reverse of the encoding process.

Figure 2:
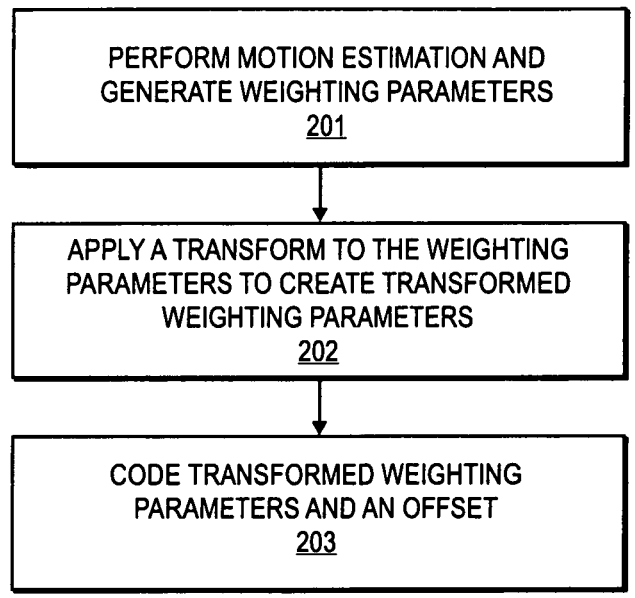
FIG. 2 is a flow diagram of one embodiment of an encoding process.

FIG. 2 is a flow diagram of one embodiment of an encoding process. The process is performed by processing logic that may comprise hardware (circuitry, dedicated logic, etc.), software (such as is run on a general purpose computer system or a dedicated machine), or a combination of both.

Referring to FIG. 2, the process begins by processing logic generating weighting parameters for multi-hypothesis partitions (e.g., bi-predictive partitions) as part of performing motion estimation (processing block 201). In one embodiment, the weighting parameters comprise at least one pair of a set of weighting parameters for each partition (block) of a frame being encoded. In one embodiment, the weights for multiple pairs of transformed weighting parameters sum to a constant. In one embodiment, different weighting factors for at least two partitions of the frame are used. In one embodiment, the weighting parameters compensate for local brightness variations.

In one embodiment, the weighted prediction parameters have variable fidelity levels. The variable fidelity levels are either predefined or signaled as part of a bitstream that includes an encoded representation of the transformed weighting parameters. In one embodiment, one group of weighting parameters have a higher fidelity than those of another group of weighting parameters.

Next, processing logic applies a transform to the weighting parameters to create transformed weighting parameters (processing block 202). In one embodiment, transforming the weighting parameters comprises applying a transform to at least two weighting parameters associated with each reference. In one embodiment, transforming the weighting parameters comprises applying a transform that satisfies the following:

$$B\_wQ_0 = wQ_0 + wQ_1,$$

$$B\_wQ_1 = wQ_0 - ((wQ_0 + wQ_1) >> 1)$$

where $wQ_0$ and $wQ_1$ are quantized weight parameters are $B\_wQ_0$ and $B\_wQ_1$ are transformed versions of $wQ_0$ and $wQ_1$.

After applying a transform to the weighting parameters, processing logic codes transformed weighting parameters and an offset (processing block 203). In one embodiment, the transformed weighting parameters are coded with at least one offset using variable length encoding. The variable length encoding may use a zero tree coding structure. Variable length encoding may comprise Huffman coding or arithmetic coding.

In one embodiment, coding the transformed weighting parameters comprises differentially coding using predictions based on one of a group consisting of transformed coefficients of neighboring partitions or predetermined weighting parameters. The predetermined weighting parameter are used when no neighboring partition exists for a prediction. The predetermined weighting parameters may be default weighting parameters or globally transmitted weighting parameters.

Figure 3:
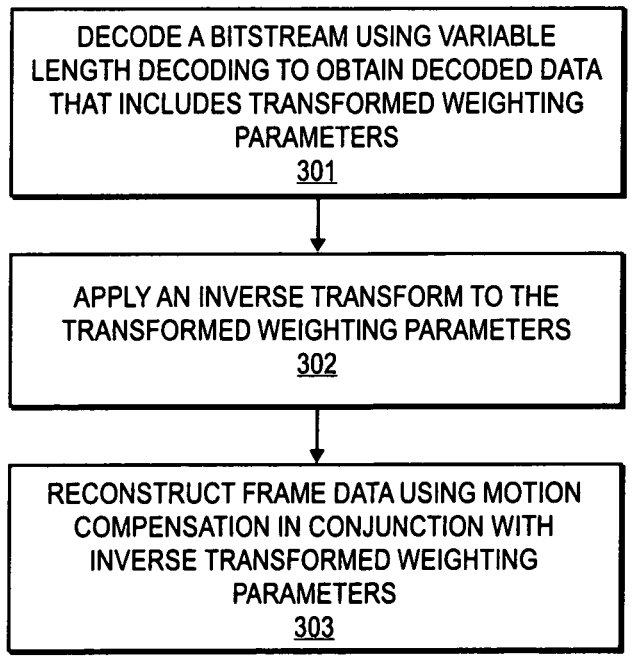
FIG. 3 is a flow diagram of one embodiment of a decoding process.

FIG. 3 is a flow diagram of one embodiment of a decoding process. In one embodiment, such a decoding process is used to decode information encoded as part of the encoding process of FIG. 2. The process is performed by processing logic that may comprise hardware (circuitry, dedicated logic, etc.), software (such as is run on a general purpose computer system or a dedicated machine), or a combination of both.

Referring to FIG. 3, the process begins with processing logic decoding a bitstream using variable length decoding to obtain decoded data that includes transformed weighting parameters for multi-hypothesis partitions (e.g., bi-predictive partitions) (processing block 301). Variable length decoding may comprise Huffman coding or arithmetic coding.

After variable length decoding, processing logic applies an inverse transform to the transformed weighting parameters (processing block 302). In one embodiment, the inverse transformed weighting parameters comprise at least two weighting parameters associated with a reference.

Then, processing logic reconstructs frame data using motion compensation in conjunction with inverse transformed weighting parameters (processing block 303).

Weighted Prediction Specifics

Weighted prediction is useful for encoding video data that comprises fades, cross-fades/dissolves, and simple brightness variations such as flashes, shading changes etc. Bi-prediction (and multi-hypothesis prediction in general) on the other hand makes the assumption that by combining multiple predictions using simple weighting mechanisms, one may generate a better prediction for a given signal. Conventional bi-prediction tends to use equal weights (i.e. ½) for all predictions. In one embodiment, one signal is more correlated than another, for example due to temporal distance or quantization or other noise introduced/existing within each signal. To perform weighted bi-prediction for a sample $I(x,y,t)$ at position $(x,y)$ at time t is performed, the following may be used:

$$I(x,y,t) = \text{weight}_0 \cdot I(x+dx_0, y+dy_0, t_0) + \text{weight}_1 \cdot I(x+dx_1, y+dy_1, t_1) + \text{offset} \quad (5)$$

where $\text{weight}_k$, $dx_k$, $dy_k$, and $t_k$ are the weights, horizontal and vertical displacement, and time corresponding to prediction from list k, and offset is the offset parameter. In one embodiment, for the implicit weighted prediction, weights are selected such that $$\text{weight}_0 + \text{weight}_1 = c \quad (6)$$

where c is a constant. In one embodiment, the constant c is equal to 1. This could basically also be seen as the computation of the weighted average between all prediction samples.

The above relationship between the two bi-predictive weights holds true in most cases, i.e. for conventional content without the presence of brightness variations or cross fades.

In one embodiment, instead of using parameters $\text{weight}_0$ and $\text{weight}_1$, the N-bit quantized parameters $wQ_0$ and $wQ_1$ are used. In one embodiment, N is 6 bits. Using substitution, equation 5 above then becomes equal to:

$$I(x,y,t) = ((wQ_0 \cdot I(x+dx_0, y+dy_0, t_0) + wQ_1 \cdot I(x+dx_1, y+dy_1, t_1) + (1 << (N-1))) >> N) + \text{offset} \quad (7)$$

where << denotes a left bit shift operator and >> denotes a right bit shift operator.

Then two new parameters, namely the transformed quantized parameters $B\_wQ_0$ and $B\_wQ_1$, and their relationship to the quantized parameter are as follows:

$$wQ_0 = (B\_wQ_0 >> 1) + B\_wQ_1 \quad (8)$$
$$wQ_1 = ((B\_wQ_0 + 1) >> 1) - B\_wQ_1 = B\_wQ_0 - wQ_0$$

$$\Rightarrow B\_wQ_0 = wQ_0 + wQ_1 \quad (9)$$
$$B\_wQ_1 = wQ_0 - ((wQ_0 + wQ_1) >> 1)$$

Considering that the relation in equation 6 may hold for a majority of blocks/partitions, in one embodiment, $B\_wQ_0$ may be further modified to $$B\_wQ_0 = wQ_0 + wQ_1 - (1 << N)$$

finally resulting in equations:

$$wQ_0 = ((B\_wQ_0 + (1 << N)) >> 1) + B\_wQ_1$$

$$wQ_1 = B\_wQ_0 + (1 << N) - wQ_0 \quad (10)$$

In an alternative embodiment, using differentiated coding, $1 << N$ is used as a default predictor for $B\_wQ_0$.

In one embodiment, parameters $B\_wQ_0$ and $B\_wQ_1$ are coded as is. In another embodiment, the parameters $B\_wQ_0$ and $B\_wQ_1$ are differentially coded by considering the values of $B\_wQ_0$ and $B\_wQ_1$ from neighboring bi-predicted partitions. If no such partitions exist, then these parameters could be predicted using default values $dB\_wQ_0$ and $dB\_wQ_1$ (e.g., both values could be set to 0).

Figure 10:
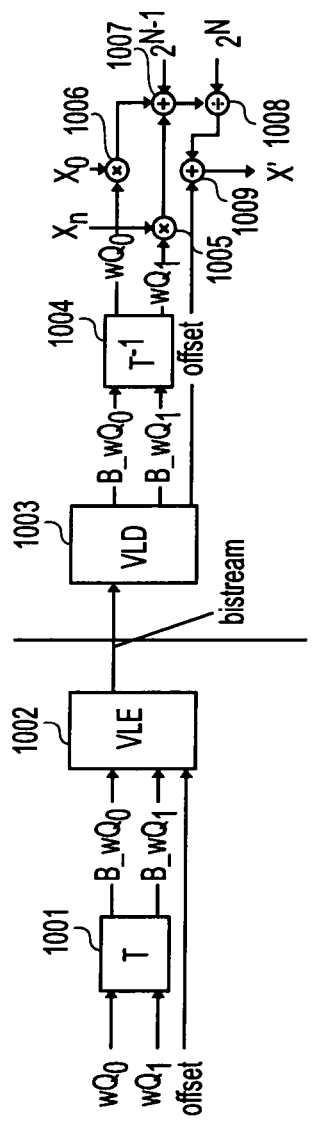
FIG. 10 illustrates a transform process of the weighting parameters for coding frames using biprediction.

FIG. 10 illustrates a transform process of the weighting parameters for coding frames using bi-prediction. Referring to FIG. 10, transform 1001 receives the quantized weighting parameters $wQ_0$ and $wQ_1$ and produces transformed weighting parameters $B\_wQ_0$ and $B\_wQ_1$, respectively. These transformed weighting parameters are variable length encoded using variable length encoder 1002 along with the offset. Thereafter, the encoded weighting parameters are sent as part of the bitstream to a decoder. The variable length decoder 1103 decodes the bitstream and produces the transformed weighting parameters $B\_wQ_0$ and $B\_wQ_1$, along with the offset. Inverse transform 1004 inverse transforms the transformed weighting parameters to produce the quantized version of the weighting parameters $wQ_0$ and $wQ_1$. Weighting parameter $wQ_0$ is multiplied by a motion-compensated sample $x_0$ by multiplier 1006 to produce an output which is input into adder 1007. Weighting parameter $wQ_1$ is multiplied by a motion-compensated sample $x_1$ using multiplier 1005. The result from multiplier 1005 is added to the output of multiplier 1006 and to $2^{N-1}$ using adder 1007. The output of adder 1007 is divided by $2^N$ by divider 1008. The result of the division is added to the offset using adder 1009 to produce a predicted sample x'.

Note that the present invention is not limited to the bi-prediction case; it is equally applicable to the multi-hypothesis case where M different hypothesis are used. By again making the assumption that the most likely relationship between the M hypothesis weights is of the form $$\sum_{i=0}^{M-1} weight_i = c,$$

in one embodiment, the original weighting parameters are transformed into the following format:

$$B\_wQ_0 = \sum_{i=0}^{M-1} wQ_i \qquad (11)$$

$$B\_wQ_k = wQ_{k-1} - \left(\frac{B\_wQ_0}{M}\right)$$

for $k = 1, \ldots, M-1$ while the final weighting parameters could be generated as:

$$wQ_k = \frac{B\_wQ_0}{M} + B\_wQ_{k+1} \qquad (12)$$

for $k = 0, \ldots, M-2$ $$wQ_{M-1} = B\_wQ_0 - \sum_{i=0}^{i=M-2} wQ_i$$

Figure 11:
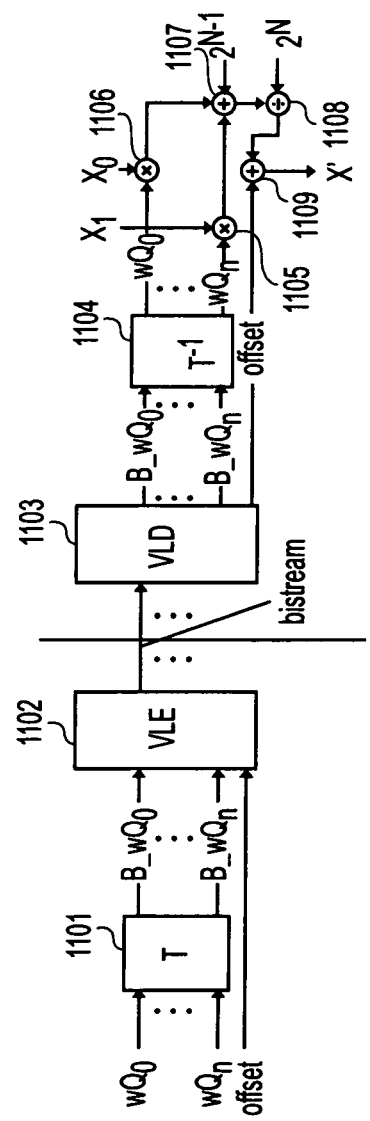
FIG. 11 illustrates the process for weighting parameters for the multi-hypothesis case.

FIG. 11 illustrates the process for weighting parameters for the multi-hypothesis case. Referring to FIG. 11, the same arrangement as shown in FIG. 10 is shown in FIG. 11 with the difference that sets of two or more weighting parameters are transformed by transform 1101 and variable length encoder 1102 encodes sets of quantized weighting parameters along with one offset for each set With respect to decoding, variable length decoder 1103 decodes the bitstream to produce sets of transformed weighting parameters. Each set of transformed weighting parameters is inverse transformed by an inverse transform 1104, the output of which are a combined to produce a predicted sample x' in the same way as is done in FIG. 10. Adder 1107 adds the results of all multiplications for all of the quantized weighting parameters.

In general, the same picture or slice may have a combination of both bi-predicted and uni-predicted partitions. In particular, it is possible for a bi-predicted partition to have a uni-predicted neighbor using either list0 or list1 prediction, or even a uni-predicted partition using listX (where X could be 0 or 1) having neighbors using a different list. Although motion vectors within a bi-predicted partition could still be correlated with motion vectors of a uni-predicted partition, this is less likely to be the case for motion vectors of different lists, but also of weighting parameters using different number of hypotheses (i.e. weights from bi-predicted partitions may have little relationship with weights from uni-predicted partitions, while a weight and motion vector from a uni-predicted partition using list 0, may have little relationship with these parameters from another partition using list 1). In one embodiment, all weights from a given prediction mode (list0, list1, and bi-predicted) are restricted to be only predicted from adjacent partitions in the same mode. In one embodiment, if the current partition is a bi-predicted partition, and all R neighbors ($Neigh_0$, $Neigh_1$, ... $Neigh_R$) are also bi-predicted, then a weighting parameter $B\_wQ_k$ is predicted as:

$$B\_wQ_1 = f(Neigh_0, \ldots Neigh_R, k) + dB\_wQ_k \qquad (13)$$

where $f(\ )$ corresponds to the relationship used to determine the prediction for the k-th weighting parameter. In one embodiment, a function used for $f$, for example, is the median value of all predictors.

In alternative embodiments, a function such as the mean, consideration of only the top or left neighbors based on the reference frame they use or/and a predefined cost, etc. However, if $Neigh_j$ uses a different prediction type, then it may be excluded from this prediction process. In one embodiment, if no predictions are available, then default values, as previously discussed could be used as a predictor.

Figure 4:
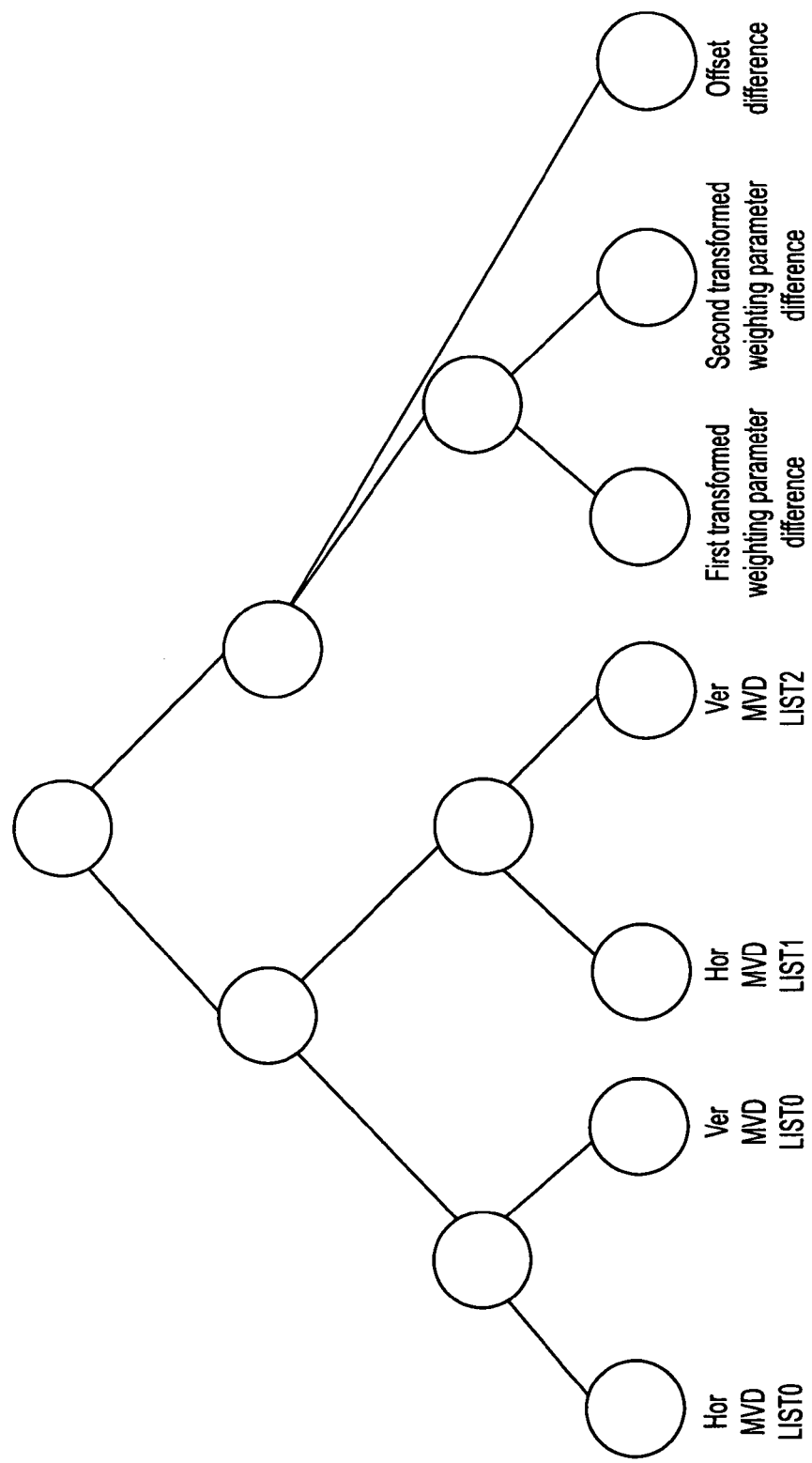
FIG. 4 illustrates a tree with parent-child relationships for encoding of bi-prediction motion information.
Figure 5:
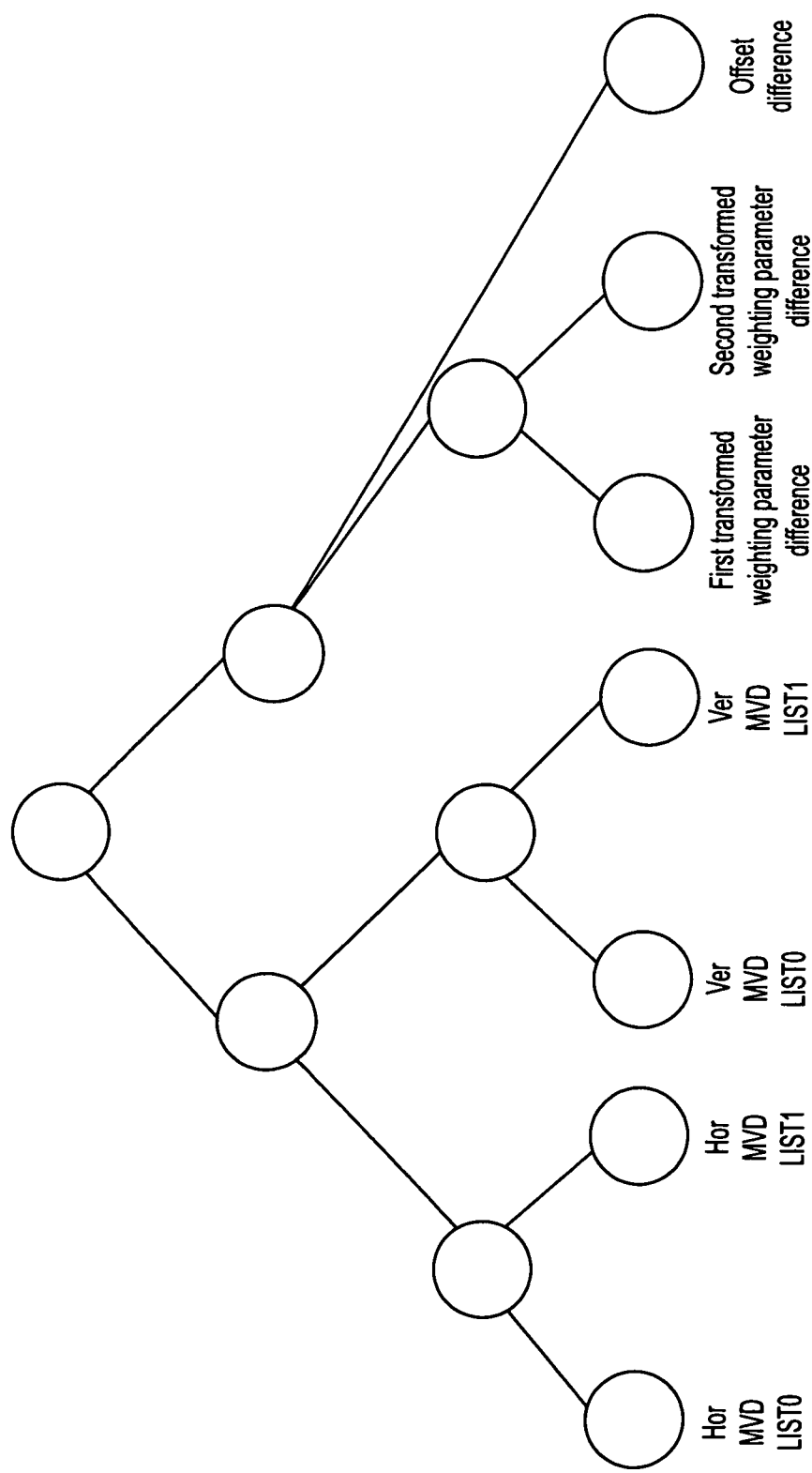
FIG. 5 illustrates another tree with node information that may be encoded.

In one embodiment, after prediction, zero tree coding is employed to further efficiently encode the weighting parameters, and in general the motion parameters for a block. FIGS. 4 and 5 represent two possible trees with the node information that may be encoded. Referring to FIG. 4, an example parent-child relationship for encoding of bi-prediction motion information is shown. In this example, nodes are segmented based on lists, with the horizontal and vertical motion vector displacement difference for List0 having a common parent node and the horizontal and vertical motion vector displacement difference for List1 having a common parent node. In FIG. 5, motion is segmented based on motion vector component. In this case, the horizontal motion vector displacement difference for both List0 and List1 have a common parent node, while the vertical motion vector displacement difference for both List0 and List1 have a common parent mode.

The trees described in FIGS. 4 and 5 containing both node type data and leaf indices data may be encoded (and subsequently decoded) using tree coding (e.g., zero tree coding) as described in U.S. patent application Ser. No. 11/172,052, entitled "Method and Apparatus for Coding Positions of Coefficients," filed Jun. 29, 2005.

Default values for a given prediction type, however, do not have to be fixed. In one embodiment, a set of global/default parameters are used and coded such as the ones used by the H.264 explicit mode, or alternatively derive these parameters using a mechanism similar to that of the H.264 implicit mode. The method or parameters could be signaled at the picture or slice level.

Figure 9:
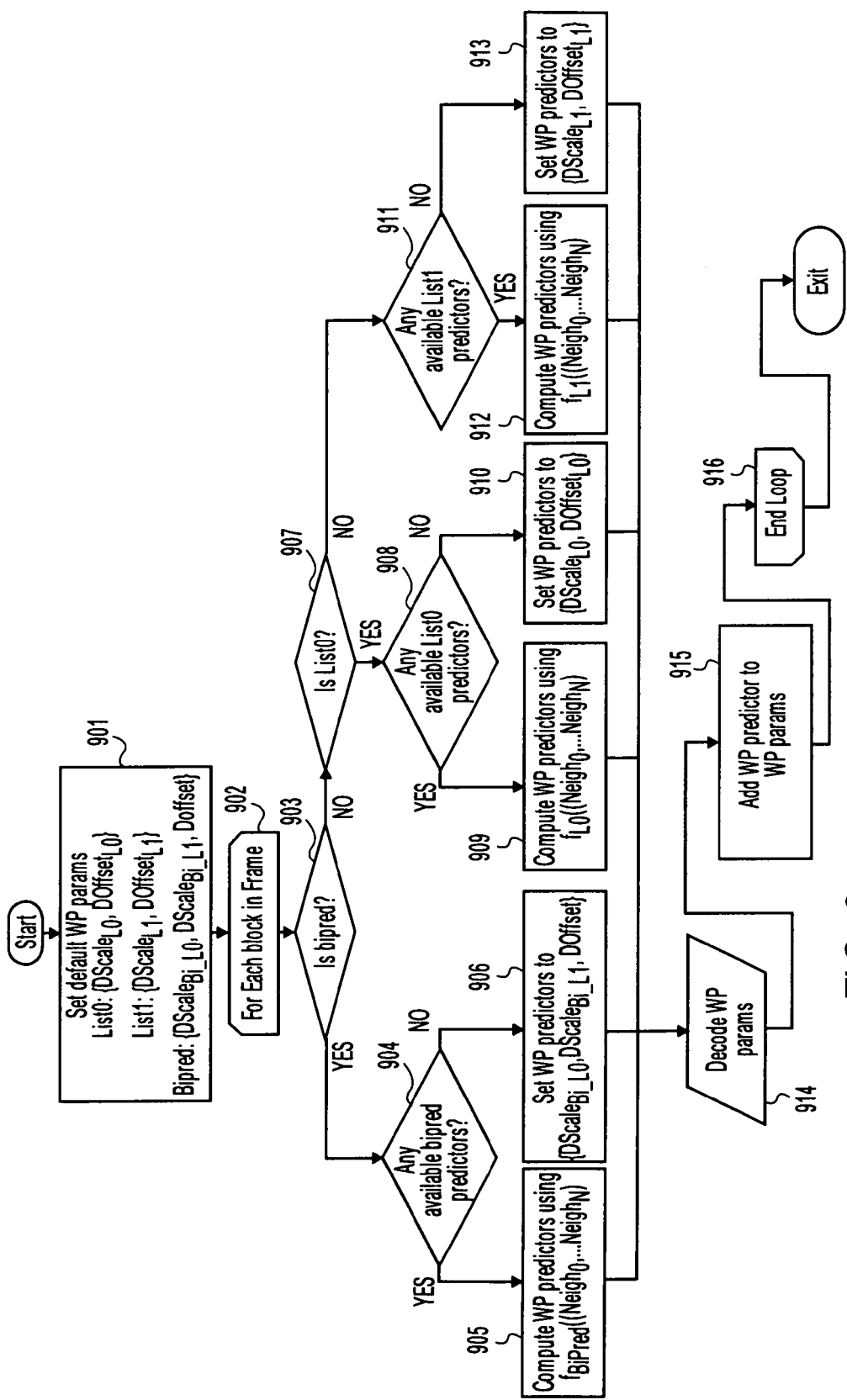
FIG. 9 illustrates one embodiment of a flow diagram for a process of using global and local weighting jointly.

FIG. 9 is a flow diagram of one embodiment for a process of using global and local weighting jointly. The process is performed by processing logic that may comprise hardware (circuitry, dedicated logic, etc.), software (such as is run on a general purpose computer system or a dedicated machine), or a combination of both.

Referring to FIG. 9, the process begins by setting default weighting parameters (processing block 901). In such a case, there are default scaling and offset parameters for List0, List1, and Bipred. For List0, the default weighting parameters are $\{DScale_{L0}, DOffset_{L0}\}$. For List1, the weighting parameters are $\{DScale_{L1}, DOffset_{L1}\}$. For bi-prediction, the default weighting parameters are $\{DScale_{Bi\_L0}, DScale_{Bi\_L1}, DOffset\}$.

Then the process continues for each block in the frame, where processing logic tests whether the block is a bi-prediction block (processing block 903). If so, processing logic transitions to processing block 904 where the processing logic tests whether there are any available bi-prediction predictors. If there are, processing logic computes the weighting parameter predictors using neighbors using a function $f_{bipred}$ (Neigh$_0$ . . . Neigh$_1$) (processing block 905) and processing continues to processing block 914. If there are no available bi-prediction predictors, processing logic sets the weighting parameters to the default {DScale$_{Bi\_L0}$, DScale$_{Bi\_L1}$, DOffset} (processing block 906) and the processing transitions to processing block 914.

If the block in the frame is not undergoing bi-prediction, processing transitions to processing block 907 where processing logic tests whether the block list is List0. If it is, processing logic transitions to processing block 908 where the processing logic tests whether there are any available List0 prediction predictors. If there are, processing logic computes the weighting parameter predictors using neighbors $f_{L0}$(Neigh$_0$ . . . Neigh$_1$) (processing block 909) and processing continues to processing block 914. If there are no available List0 predictors, processing logic sets the weighting parameters to the default values {DScale$_{L0}$, DOffset$_{L0}$} (processing block 910) and the processing transitions to processing block 914.

If the block isn't undergoing prediction using List0, processing transitions to processing block 911 where the processing logic tests whether there are any available List1 prediction predictors. If there are, processing logic computes the weighting parameter predictors using neighbors $f_{L0}$(Neigh$_0$ . . . Neigh$_1$) (processing block 912) and processing continues to processing block 914. If there are no available List1 predictors, processing logic sets the weighting parameters to the default values {DScale$_{L1}$, DOffset$_{L1}$} (processing block 913) and the processing transitions to processing block 914.

At processing block 914, processing logic decodes the weighting parameters. Thereafter, the weighting parameters predictors are added to the weighting parameters (processing block 915). The process then repeats for each block in the frame, and when each block in the frame has been processed, the process ends.

Based on the discussion above, separate default weights for bi-predicted and uni-predicted partitions can be used, while such parameters could be estimated using similar methods as presented in Kamikura, et al., "Global Brightness-Variation Compensation for Video Coding," IEEE Trans on CSVT, vol. 8, pp. 988-1000, December 1998 and J. Boyce, "Weighted prediction in the H.264/MPEG4 AVC video coding standard", ISCAS, pp. 789-792, May 2004. Table 1 shows an example prediction weight table syntax that could be used for this purpose. It could be observed that in this table, global weights could be signaled separately for uni-predicted and bi-predicted regions.

Furthermore, bi-predicted weights could have different dynamic range, while the parameters luma_bipred_weight_type and chroma_bipred_weight_type are used to control the method that is to be used for deriving the weights. More specifically for luma, if luma_bipred_weight_type is set to 0, then the default ½ weight is used. If 1, then implicit mode is used, while if 2, the uniprediction weights are used instead as is currently done in H.264 explicit mode. Finally, if 3, weighting parameters are transmitted explicitly within this header.

TABLE 1

Proposed Prediction Weight Table Syntax

| pred_weight_table( ) { | C | Descriptor |
|---|---|---|
| //! Dynamic range of unipred weighted parameters | | |
|     luma_log2_weight_denom | 2 | ue(v) |
|     chroma_log2_weight_denom | 2 | ue(v) |
| //! Signal Uni-pred weigths for list0 | | |
|     for( i = 0; i <= num_ref_idx_l0_active_minus1; i++ ) { | | |
|         luma_weight_l0_flag | 2 | u(1) |
|         if( luma_weight_l0_flag ) { | | |
|             luma_weight_l0[ i ] | 2 | se(v) |
|             luma_offset_l0[ i ] | 2 | se(v) |
|         } | | |
|         chroma_weight_l0_flag | 2 | u(1) |
|         if( chroma_weight_l0_flag ) | | |
|             for( j =0; j < 2; j++ ) { | | |
|                 chroma_weight_l0[ i ][ j ] | 2 | se(v) |
|                 chroma_offset_l0[ i ][ j ] | 2 | se(v) |
|             } | | |
|     } | | |
|     if( slice_type = = B) { | | |
|         use_separate_bipred_weights | 2 | u(1) |
| //! Signal Uni-pred weigths for list1 | | |
|         for( I = 0; i <= num_ref_idx_l1_active_minus1; i++ ) { | | |
|             luma_weight_l1_flag | 2 | u(1) |
|             if( luma_weight_l1_flag ) { | | |
|                 luma_weight_l1[ i ] | 2 | se(v) |
|                 luma_offset_l1[ i ] | 2 | se(v) |
|             } | | |
|             chroma_weight_l1_flag | 2 | u(1) |
|             if( chroma_weight_l1_flag ) | | |
|                 for( j = 0; j < 2; j++ ) { | | |
| chroma_weight_l1[ i ][ j ] | 2 | se(v) |
| chroma_offset_l1[ i ][ j ] | 2 | se(v) |
|                 } | | |
|         } | | |
| //! Signal bi-predictive weights if required | | |

TABLE 1-continued

Proposed Prediction Weight Table Syntax

| pred_weight_table( ) { | C | Descriptor |
|---|---|---|
|   if (use_separate_bipred_weights) { | | |
| //! Dynamic range of bipred weighted parameters | | |
|         luma_bipred_log2_weight_denom | 2 | ue(v) |
|         chroma_bipred_log2_weight_denom | 2 | ue(v) |
|         for( j = 0; j <= num_ref_idx_l0_active_minus1; j++ ) { | | |
|             luma_bipred_weight_type | 2 | ue(v) |
|             chroma_bipred_weight_type | 2 | ue(v) |
|             for( i = 0; i <= num_ref_idx_l1_active_minus1; i++ ) { | | |
|             if (luma_bipred_weight_type == 3) { | | |
|               luma_bipred_weight_l0[ j ][ I ] | 2 | se(v) |
|               luma_bipred_weight_l1[ j ][ I ] | 2 | se(v) |
|               luma_bipred_offset [ j ][ i ] | 2 | se(v) |
|             } | | |
|             if (chroma_bipred_weight_type == 3) | | |
|               for(k = 0; k < 2; k++) { | | |
|                 chroma_bipred_weight_l0[ j ][ i ][ k ] | 2 | se(v) |
|                 chroma_bipred_weight_l1[ j ][ i ][ k ] | 2 | se(v) |
|                 chroma_bipred_offset [ j ][ i ][ k ] | 2 | se(v) |
|               } | | |
|             } | | |
|         } | | |
|   } | | |
| } | | |

Although the fidelity of the weighting and offset parameters could be fixed, i.e. a weighting parameter is uniformly quantized to N bits, non uniform quantization may instead be more efficient and appropriate to better handle different variations within a frame. In one embodiment, a finer fidelity is used for smaller weighting or offset parameters, whereas fidelity is increased for larger parameters.

In general, encoding a parameter $qw_k$ that provides a mapping to the weighting parameters $B\_wQ_k$, $wQ_k$, or even possibly to the differential value $dB\_wQ_k$ is contemplated, using an equation of the form:

$$B\_wQ_k = g(qw_k) \text{ with } qw_k = -(1<<(N-1)), \ldots, (1<<(N-1))-1 \quad (14)$$

Some possible functions that may use are as follows:

$$g(x) = x^2, \quad (15)$$

$$g(x) = \begin{cases} x & \text{if } x < m \\ x^2 & \text{otherwise} \end{cases}, \quad (16)$$

$$g(x) = (a \cdot x)^2 + b \cdot x + c, \text{ where } a, b, c \text{ are constants } \in R \quad (17)$$

$$g(x) = \sum_{i=0}^{M} (c_n \cdot x)^n, \text{ with } M \text{ and } c_n \text{ being constants} \quad (18)$$

$$g(x) = x + (x>>2)^2 \quad (19)$$

$$g(x) = a^{(x+b)} + c, \text{ where } a, b, c \text{ are constants} \quad (20)$$

etc.

Figure 8:
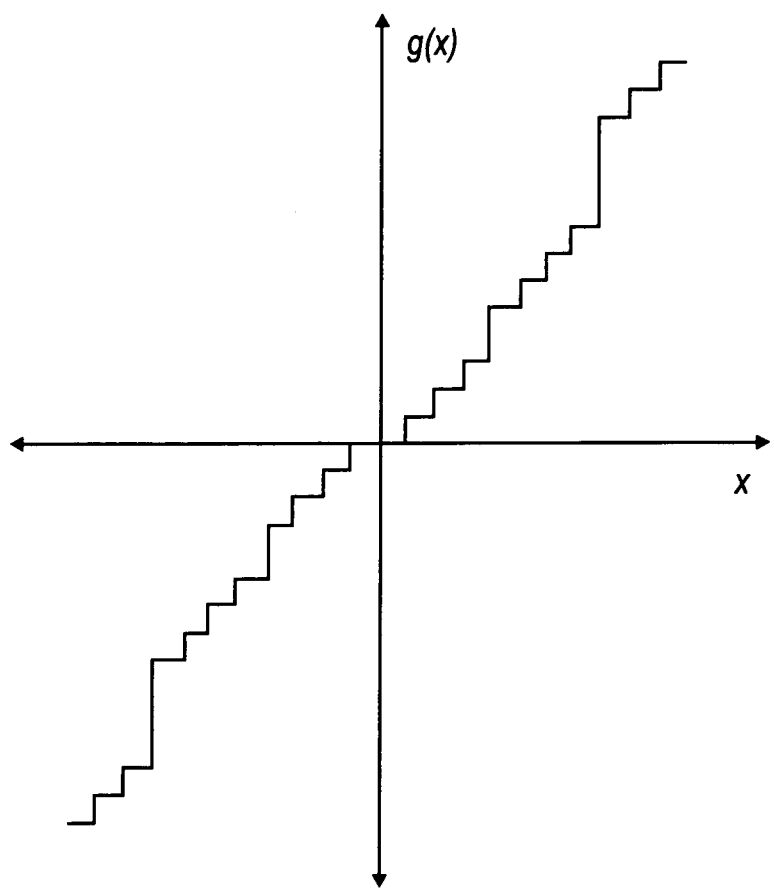
FIG. 8 is an example of the relationship between the representation and the true value of the weighting parameter.

The function represented by equation 17 (or the more generic equation 18) allows for increased flexibility in terms of representing the fidelity of the weighting parameters. Note also that the operation a·x could indicate not only a multiply, but also an integer or floating point divide (i.e. assume that a is less than 1). FIG. 8 is an example of the relationship between the representation and the true value of the weighting parameter.

In one embodiment, the parameters are determined by performing a pre-analysis of the frame or sequence, generating the distribution of the weighting parameters, and approximating the distribution with g(x) (i.e. using a polynomial approximation).

Figure 12:
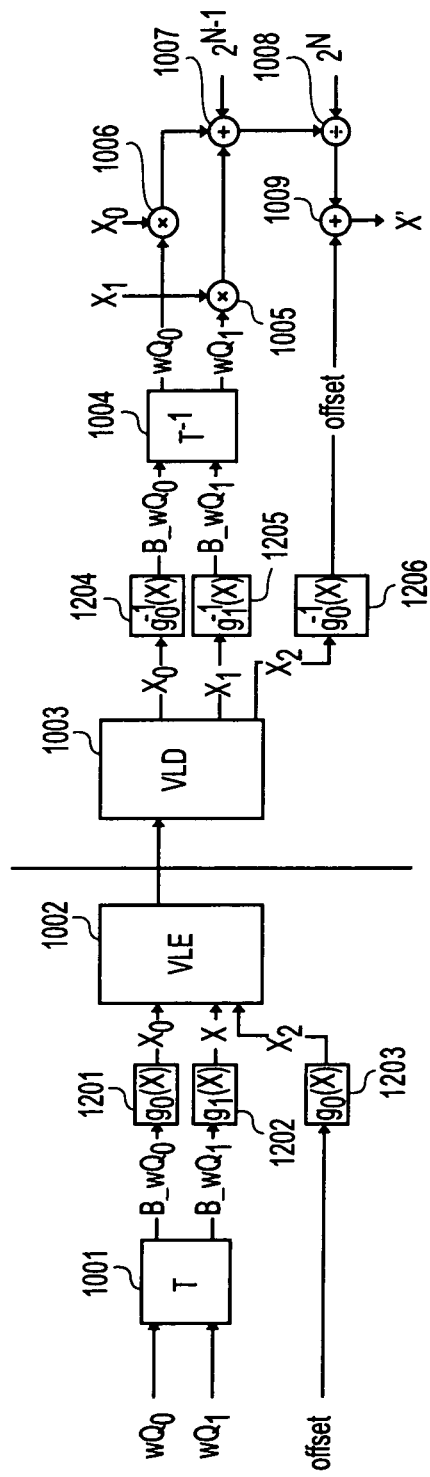
FIG. 12 illustrates the transform process of the weighting parameters for biprediction with controlled fidelity.

FIG. 12 illustrates the transform process of the weighting parameters for bi-prediction with controlled fidelity. Referring to FIG. 12, the process is the same as in FIG. 10, with the exception that each of the transformed weighting parameters output from transform 1001 isn't input directly into variable-length encoder 1002, along with the offset. Instead, they are input into functions, the output of which are input to variable length encoder 1002. More specifically, transform weighting parameter $B\_wQ_0$ is input into function $g_0(x)$ to produce $x_0$. More specifically, transform weighting parameter $B\_wQ_1$ is input into function $g_1(x)$ to produce $x_1$ (1202). The offset is also subjected to function $g_0(x)$ to produce $x_2$ (1203).

Similarly, the output of decoder 1003 which are $x_0$, $x_1$ and $x_2$, are input into functions $g_0^{-1}(x)$ (1204), $g_1^{-1}(x)$ (1205), and $g_0^{-1}(x)$ (1206), which produce the transformed weighting parameters in the offset. Thereafter, these are handled in the same manner as shown in FIG. 10.

Examples of an Encoder and a Decoder

Figure 6:
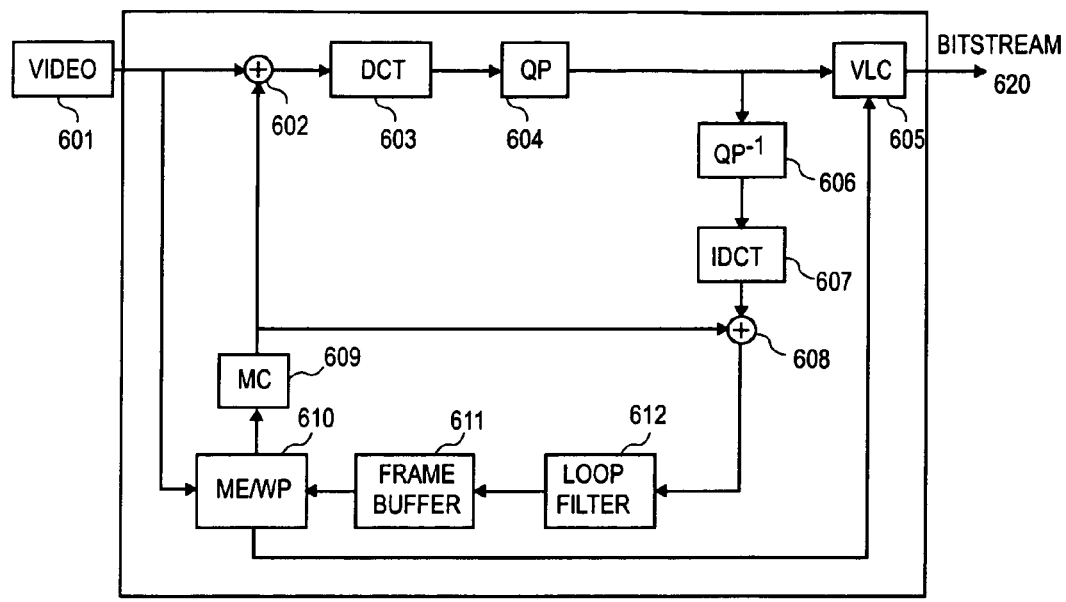
FIG. 6 is a block diagram of one embodiment of an encoder.

FIG. 6 is a block diagram of one embodiment of an encoder. In one embodiment the encoder first divides the incoming bitstream into rectangular arrays, referred to as macroblocks. For each macroblock, the encoder then chooses whether to use intra-frame or inter-frame coding. Intra-frame coding uses only the information contained in the current video frame and produces a compressed result referred to as an I-frame. Intra-frame coding can use information of one or more other frames, occurring before or after the current frame. Compressed results that only use data from previous frames are called P-frames, while those that use data from both before and after the current frame are called B-frames.

Referring to FIG. 6, video 601 is input into the encoder. In the case of encoding a frame without motion compensation, frames of video are input into DCT 603. DCT 603 performs a 2D discrete cosign transform (DCT) to create DCT coefficients. The coefficients are quantized by quantizer 604. In one embodiment, the quantization performed by quantizer 604 is weighted by scaler. In one embodiment, the quantizer scaler parameter QP takes values from 1 to 31. The QP value can be modified in both picture and macroblock levels.

Thereafter, the quantized coefficients undergo variable length encoding at VLC 605, which generates bitstream 620. In one embodiment, VLC 605 performs entropy coding by using Huffman coding or arithmetic coding.

Note that, in one embodiment, prior to VLC 605, reordering may be performed in which quantized DCT coefficients are zigzag scanned so that a 2D array of coefficients is converted into a 1D array of coefficients in a manner well-known in the art. This may be followed by run length encoding in which the array of reordered quantized coefficients corresponding to each block is encoded to better represent zero coefficients. In such a case, each nonzero coefficient is encoded as a triplet (last, run, level), where "last" indicates whether this is the final nonzero coefficient in the block, "run" signals the preceeding 0 coefficients and "level" indicates the coefficients sign and magnitude.

A copy of the frames may be saved for use as a reference frame. This is particularly the case of I or P frames. To that end, the quantized coefficients output from quantizer 604 are inverse quantized by inverse quantizer 606. An inverse DCT transform is applied to the inverse quantized coefficients using IDCT 607. The resulting frame data is added to a motion compensated predication from motion compensation (MC) unit 609 in the case of a P frame and then the resulting frame is filtered using loop filter 612 and stored in frame buffer 611 for use as a reference frame. In the case of I frames, the data output from IDCT 607 is not added to a motion compensation prediction from MC unit 609 and is filtered using loop filter 612 and stored in frame buffer 611.

In the case of a P frame, the P frame is coded with inter-prediction from previous a I or P frame, which is referred to commonly in the art as the reference frame. In this case, the interprediction is performed by motion estimation (ME) block 610 and motion compensation unit 609. In this case, using the reference frame from frame store 611 and the input video 601, motion estimation unit 610 searches for a location of a region in the reference frame that best matched the current macro block in the current frame. As discussed above, this includes not only determining a displacement, but also determining weighting parameters (WP) and an offset. The displacement between the current macroblock and the compensation region in the reference frame, along with the weighting parameters and the offset is called the motion vector. The motion vectors for motion estimation unit 610 are sent to motion compensation unit 609. At motion compensation unit 609, the prediction is subtracted from the current macroblock to produce a residue macroblock using subtractor 602. The residue is then encoded using DCT 603, quantizer 604 and VLC 605 as described above.

Motion estimation unit 610 outputs the weighting parameters to VLC 605 for variable length encoding 605. The output of VLC 605 is bitstream 620.

Figure 7:
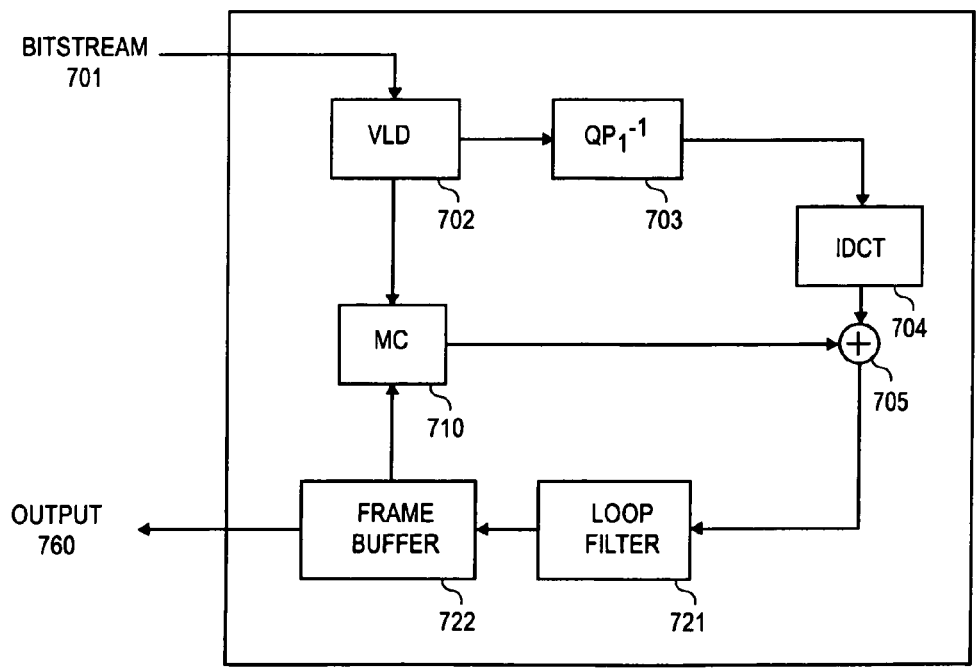
FIG. 7 is a block diagram of one embodiment of a decoder.

FIG. 7 is a block diagram of one embodiment of a decoder. Referring to FIG. 7, bitstream 701 is received by variable length decoder 702 which performs variable length decoding. The output of variable length decoding is sent to inverse quantizer 703 which performs an inverse quantization operation that is the opposite of the quantization performed by quantizer 604. The output of inverse quantizer 703 comprise coefficients that are inverse DCT transformed by IDCT 704 to produce image data. In the case of I frames, the output of IDCT 704 is simply filtered by loop filter 721, stored in frame buffer 722 and eventually output as output 760. In the case of P frames, the image data output from IDCT 704 is added to the prediction from motion compensation unit 710 using adder 705. Motion compensation unit 710 uses the output from variable length decoder 722, which includes the weighting parameters discussed above, as well as reference frames from frame buffer 722. The resulting image data output from adder 705 is filtered using loop filter 721 and stored in frame buffer 722 for eventual output as part of output 760.

Thus, as set forth above, embodiments of the present invention allows improved representation of weighting parameters for bi-predictive partitions and improved coding efficiency (i.e. in terms of increased PSNR for a given bitrate) in the presence of brightness variations, or/and cross fades.

An Example of a Computer System

Figure 13:
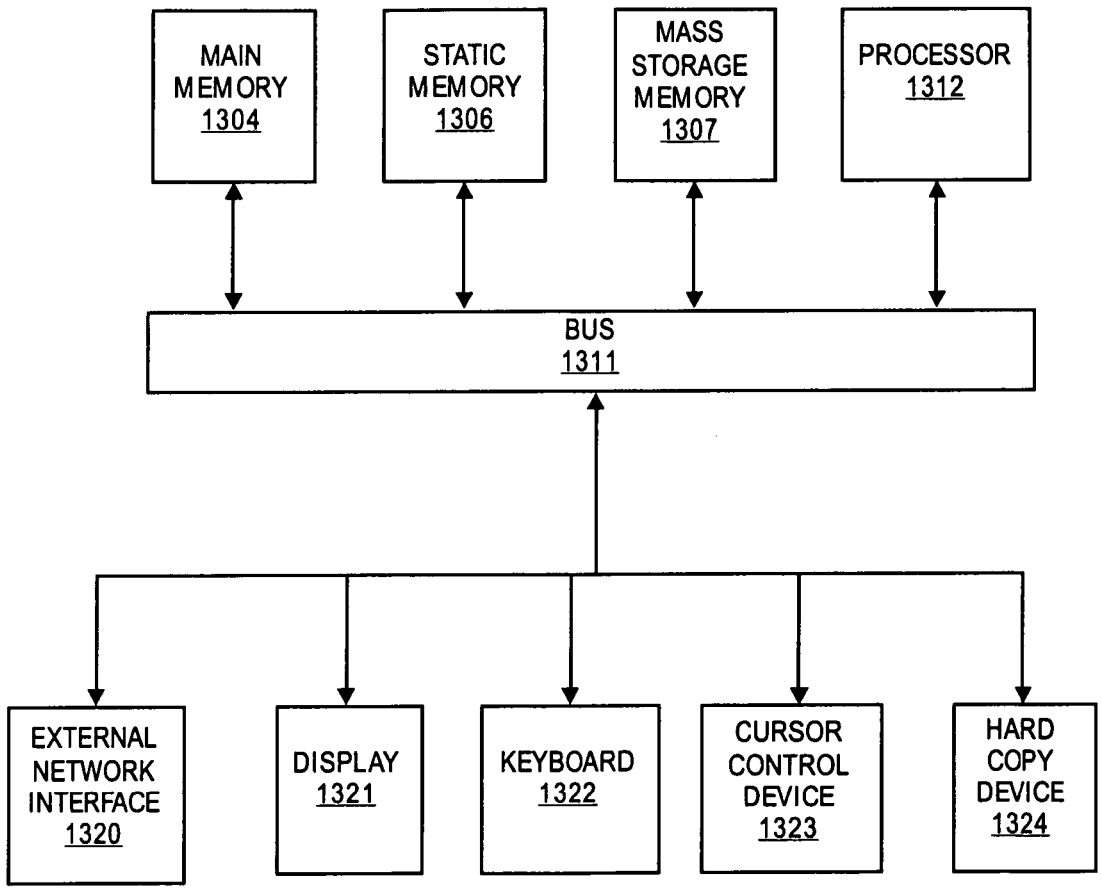
FIG. 13 is a block diagram of an exemplary computer system that may perform one or more of the operations described herein.

FIG. 13 is a block diagram of an exemplary computer system that may perform one or more of the operations described herein. Referring to FIG. 13, computer system 1300 may comprise an exemplary client or server computer system. Computer system 1300 comprises a communication mechanism or bus 1311 for communicating information, and a processor 1312 coupled with bus 1311 for processing information. Processor 1312 includes a microprocessor, but is not limited to a microprocessor, such as, for example, Pentium™, PowerPC™, Alpha™, etc.

System 1300 further comprises a random access memory (RAM), or other dynamic storage device 1304 (referred to as main memory) coupled to bus 1311 for storing information and instructions to be executed by processor 1312. Main memory 1304 also may be used for storing temporary variables or other intermediate information during execution of instructions by processor 1312.

Computer system 1300 also comprises a read only memory (ROM) and/or other static storage device 1306 coupled to bus 1311 for storing static information and instructions for processor 1312, and a data storage device 1307, such as a magnetic disk or optical disk and its corresponding disk drive. Data storage device 1307 is coupled to bus 1311 for storing information and instructions.

Computer system 1300 may further be coupled to a display device 1321, such as a cathode ray tube (CRT) or liquid crystal display (LCD), coupled to bus 1311 for displaying information to a computer user. An alphanumeric input device 1322, including alphanumeric and other keys, may also be coupled to bus 1311 for communicating information and command selections to processor 1312. An additional user input device is cursor control 1323, such as a mouse, trackball, trackpad, stylus, or cursor direction keys, coupled to bus 1311 for communicating direction information and command selections to processor 1312, and for controlling cursor movement on display 1321.

Another device that may be coupled to bus 1311 is hard copy device 1324, which may be used for marking information on a medium such as paper, film, or similar types of media. Another device that may be coupled to bus 1311 is a wired/wireless communication capability 1325 to communication to a phone or handheld palm device.

Note that any or all of the components of system 1300 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An encoding method comprising:
   generating, with a processing device, weighting parameters for multi-hypothesis partitions, wherein each of the multi-hypothesis partitions is associated with a plurality of blocks belonging to one or more reference frames;
   transforming one or more of the weighting parameters based on one or more other weighting parameters, including transforming each weighting parameter of a plurality of the one or more weighting parameters by computing a linear combination of said each weighting parameter and at least one of the one or more other weighting parameters, wherein the linear combination is greater than one; and coding the transformed weighting parameters.

2. The method defined in claim 1 further comprising coding offsets with the transformed weighting parameters.

3. The method defined in claim 1 wherein the weighting parameters comprise a set of weighting parameters for each partition of a frame being encoded.

4. The method defined in claim 1 wherein motion compensated prediction uses different weighting factors for at least two partitions of the frame.

5. The method defined in claim 1 wherein the multi-hypothesis partitions comprise bi-predictive partitions.

6. The method defined in claim 1 wherein the weighting parameters compensate for local brightness variations.

7. An encoding method comprising:
   generating, with a processing device, weighting parameters for multi-hypothesis partitions;
   transforming the weighting parameters, wherein transforming the weighting parameters comprises applying a transform that satisfies the following:

$$B\_wQ_0 = wQ_0 + wQ_1$$

$$B\_wQ_1 = wQ_0 - ((wQ_0 + wQ_1) >> 1)$$

where $wQ_0$ and $wQ_1$ are quantized weight parameters are $B\_wQ_0$ and $B\_wQ_1$ are transformed versions of $wQ_0$ and $wQ_1$; and
   coding transformed weighting parameters.

8. The method defined in claim 2 wherein transformed weighting parameters and offsets are coded using variable length encoding.

9. The method defined in claim 8 wherein the variable length encoding uses a zero tree coding structure.

10. The method defined in claim 1 wherein coding the transformed weighting parameters comprises differentially coding using predictions based on one of a group consisting of transformed coefficients of neighboring partitions or predetermined weighting parameters.

11. An encoding method comprising:
    generating, with a processing device, weighting parameters for multi-hypothesis partitions, wherein each of the multi-hypothesis partitions is associated with a plurality of blocks belonging to one or more reference frames;
    transforming one or more of the weighting parameters based on one or more other weighting parameters, including transforming each weighting parameter of a plurality of the one or more weighting parameters by computing a linear combination of said each weighting parameter and at least one of the one or more other weighting parameters, wherein the linear combination is greater than one; and
    coding the transformed weighting parameters, wherein coding the transformed weighting parameters comprises differentially coding using predictions based on one of a group consisting of transformed coefficients of neighboring partitions or predetermined weighting parameters, and wherein predetermined weighting parameter are used when no neighboring partition exists.

12. The method defined in claim 10 wherein predetermined weighting parameter are globally transmitted weighting parameters.

13. The method defined in claim 10 wherein weighting parameters have variable fidelities.

14. An encoder comprising:
    a motion estimation unit to generate weighting parameters for multi-hypothesis partitions as part of performing motion compensated prediction, wherein each of the multi-hypothesis partitions is associated with a plurality of blocks belonging to one or more reference frames;
    a transform to transform one or more of the weighting parameters into transformed weighting parameters based on one or more other weighting parameters, the transform to include a transform of each weighting parameter of a plurality of the one or more weighting parameters by computation of a linear combination of said each weighting parameter and at least one of the one or more other weighting parameters, wherein the linear combination is greater than one; and
    a coder to code the transformed weighting parameters.

15. The encoder defined in claim 14 wherein the coder codes offsets with the transformed weighting parameters.

16. The encoder defined in claim 14 wherein the weighting parameters comprise at least one pair of a set of weighting parameters for each partition of a frame being encoded.

17. The encoder defined in claim 14 wherein the multi-hypothesis partitions comprise bi-predictive partitions.

18. The encoder defined in claim 14 wherein the weighting parameters compensate for local brightness variations.

19. An encoder comprising:
    a motion estimation unit to generate weighting parameters for multi-hypothesis partitions as part of performing motion compensated prediction;
    a transform to transform the weighting parameters into transformed weighting parameters, wherein transforming the weighting parameters comprises applying a transform that satisfies the following:

$$B\_wQ_0 = wQ_0 + wQ_1$$

$$B\_wQ_1 = wQ_0 - ((wQ_0 + wQ_1) >> 1)$$

where $wQ_0$ and $wQ_1$ are quantized weight parameters are $B\_wQ_0$ and $B\_wQ_1$ are transformed versions of $wQ_0$ and $wQ_1$; and
    a coder to code transformed weighting parameters.

20. The encoder defined in claim 14 wherein transformed weighting parameters and offsets are coded using variable length encoding.

21. The encoder defined in claim 20 wherein the variable length encoding uses a zero tree coding structure.

22. The encoder defined in claim 14 wherein coding the transformed weighting parameters comprises differentially coding using predictions based on transformed coefficients of neighboring partitions.

23. The encoder defined in claim 14 wherein coding the transformed weighting parameters comprises differentially coding using predictions based on transformed coefficients of neighboring partitions or weighting parameters.

24. An encoder comprising:
a motion estimation unit to generate weighting parameters for multi-hypothesis partitions as part of performing motion compensated prediction, wherein each of the multi-hypothesis partitions is associated with a plurality of blocks belonging to one or more reference frames;
a transform to transform one or more of the weighting parameters into transformed weighting parameters based on one or more other weighting parameters, the transform to transform each weighting parameter of a plurality of the one or more weighting parameters by computation of a linear combination of said each weighting parameter and at least one of the one or more other weighting parameters, wherein the linear combination is greater than one; and
a coder to code the transformed weighting parameters, wherein coding the transformed weighting parameters comprises differentially coding using predictions based on transformed coefficients of neighboring partitions or weighting parameters, and wherein predetermined weighting parameters are used when no neighboring partition exists for a prediction.

25. The encoder defined in claim 23 wherein the predetermined weighting parameter are one of a group consisting of a default weighting parameters and a globally transmitted weighting parameters.

26. The encoder defined in claim 23 wherein weighted prediction parameters have variable fidelity levels.

27. The encoder defined in claim 26 wherein the variable fidelity levels are either predefined or signaled as part of a bitstream that includes an encoded representation of the transformed weighting parameters.

28. A non-transitory computer-readable medium storing instructions thereon which, when executed by a system, cause the system to perform an encoding method comprising:
generating weighting parameters for multi-hypothesis partitions, wherein each of the multi-hypothesis partitions is associated with a plurality of blocks belonging to one or more reference frames;
transforming one or more of the weighting parameters based on one or more other weighting parameters, including transforming each weighting parameter of a plurality of the one or more weighting parameters by computing a linear combination of said each weighting parameter and at least one of the one or more other weighting parameters, wherein the linear combination is greater than one; and
coding the transformed weighting parameters.

29. A decoding method comprising:
decoding a bitstream using variable length decoding to obtain decoded data that includes transformed weighting parameters for multi-hypothesis partitions, wherein each of the multi-hypothesis partitions is associated with a plurality of blocks belonging to one or more reference frames and wherein one or more of the transformed weighting parameters were transformed based on one or more other weighting parameters, wherein each weighting parameter of a plurality of the one or more transformed weighting parameters was transformed by computation of a linear combination of said each transformed weighting parameter and at least one of the one or more other weighting parameters, wherein the linear combination is greater than one; and
applying an inverse transform to the transformed weighting parameters; and
reconstructing frame data using motion compensation in conjunction with inverse transformed weighting parameters.

30. The method defined in claim 29 wherein further comprising decoding offsets with a pair of the transformed weighting parameters.

31. The method defined in claim 29 wherein the weighting parameters comprise at least one pair of a set of weighting parameters for each partition of a frame being decoded.

32. The method defined in claim 29 wherein the multi-hypothesis partitions comprise bi-predictive partitions.

33. A decoding method comprising:
decoding a bitstream using variable length decoding to obtain decoded data that includes transformed weighting parameters for multi-hypothesis partitions, wherein the transformed weighting parameters were generated by applying a transform that satisfies the following:

$$B\_wQ_0 = wQ_0 + wQ_1$$

$$B\_wQ_1 = wQ_0 - ((wQ_0 + wQ_1) \gg 1)$$

where $wQ_0$ and $wQ_1$ are quantized weight parameters are $B\_wQ_0$ and $B\_wQ_1$ are transformed versions of $wQ_0$ and $wQ_1$;
applying an inverse transform to the transformed weighting parameters; and
reconstructing frame data using motion compensation in conjunction with inverse transformed weighting parameters.

34. The method defined in claim 29 wherein the variable length decoding uses a zero tree coding structure.

35. The method defined in claim 29 wherein decoding the transformed weighting parameters comprises differentially decoding the transformed weighting based on one of a group consisting of inverse transformed coefficients of neighboring partitions or predetermined weighting parameters.

36. A decoding method comprising:
decoding a bitstream using variable length decoding to obtain decoded data that includes transformed weighting parameters for multi-hypothesis partitions, wherein one or more of the transformed weighting parameters were transformed based on one or more other weighting parameters, wherein each weighting parameter of a plurality of the one or more transformed weighting parameters was transformed by computation of a linear combination of said each transformed weighting parameter and at least one of the one or more other weighting parameters, where the linear combination is greater than one; and wherein decoding the transformed weighting parameters comprises differentially decoding the transformed weighting based on one of a group consisting of inverse transformed coefficients of neighboring partitions or predetermined weighting parameters, and wherein the predetermined weighting parameters are used when no neighboring partition exists for a prediction;

applying an inverse transform to the transformed weighting parameters; and reconstructing frame data using motion compensation in conjunction with inverse transformed weighting parameters.

37. The method defined in claim 35 wherein the predetermined weighting parameters are one of a group consisting of a default weighting parameters and a globally transmitted weighting parameter.

38. The method defined in claim 35 wherein weighting parameters have variable fidelity levels.

39. A decoder comprising:

a variable length decoder to decode a bitstream using variable length decoding to obtain decoded data that includes transformed weighting parameters for multi-hypothesis partitions, wherein one or more of the transformed weighting parameters were transformed based on one or more other weighting parameters, and wherein each weighting parameter of a plurality of the one or more transformed weighting parameters was transformed by computation of a linear combination of said each transformed weighting parameter and at least one of the one or more other weighting parameters, where the linear combination is greater than one;

an inverse quantizer to perform an inverse quantization operation on a portion of the decoded data to produce coefficients;

a first inverse transform to apply a first inverse transform to the coefficients to produce image data;

a second inverse transform to apply a second inverse transform to the transformed weighting parameters to produce weighting parameters; and a motion compensation unit to generate a prediction using at least one motion vector and the weighting parameters; and an adder to add the prediction to the image data to reconstruct frame data.

40. The decoder defined in claim 39 wherein the weighting parameters comprise at least one pair of a set of weighting parameters for each partition of a frame being decoded.

41. The decoder defined in claim 39 wherein the multi-hypothesis partitions comprise bi-predictive partitions.

42. A decoder comprising:

a variable length decoder to decode a bitstream using variable length decoding to obtain decoded data that includes transformed weighting parameters for multi-hypothesis partitions, wherein the transformed weighting parameters were generated by applying a transform that satisfies the following:

$$B\_wQ_0 = wQ_0 + wQ_1$$

$$B\_wQ_1 = wQ_0 - ((wQ_0 + wQ_1) \gg 1)$$

where $wQ_0$ and $wQ_1$ are quantized weight parameters are $B\_wQ_0$ and $B\_wQ_1$ are transformed versions of $wQ_0$ and $wQ_1$;

an inverse quantizer to perform an inverse quantization operation on a portion of the decoded data to produce coefficients;

a first inverse transform to apply a first inverse transform to the coefficients to produce image data;

a second inverse transform to apply a second inverse transform to the transformed weighting parameters to produce weighting parameters;

a motion compensation unit to generate a prediction using at least one motion vector and the weighting parameters; and an adder to add the prediction to the image data to reconstruct frame data.

43. A decoder comprising:

a variable length decoder to decode a bitstream using variable length decoding to obtain decoded data that includes transformed weighting parameters for multi-hypothesis partitions, wherein one or more of the transformed weighting parameters were transformed based on one or more of the other weighting parameters, wherein each weighting parameter of a plurality of the one or more transformed weighting parameters was transformed by computation of a linear combination of said each transformed weighting parameter and at least one of the one or more other weighting parameters, where the linear combination is greater than one;

an inverse quantizer to perform an inverse quantization operation on a portion of the decoded data to produce coefficients;

a first inverse transform to apply a first inverse transform to the coefficients to produce image data;

a second inverse transform to apply a second inverse transform to the transformed weighting parameters to produce weighting parameters; and a motion compensation unit to generate a prediction using at least one motion vector and the weighting parameters, wherein one or more predetermined weighting parameters are used when no neighboring partition exists for the prediction; and an adder to add the prediction to the image data to reconstruct frame data.

44. The decoder defined in claim 39 wherein weighting parameters have variable fidelity levels.

* * * * *